[19] United States Patent
Morris et al.

[11] Patent Number: 4,728,720
[45] Date of Patent: Mar. 1, 1988

[54] POLYESTERS OF TRANS-4,4'-STILBENEDICARBOXYLIC ACID, ETHYLENE GLYCOL, AND 1,4-BUTANEDIOL

[75] Inventors: John C. Morris; Winston J. Jackson, Jr., both of Kingsport, Tenn.

[73] Assignee: Eastman Kodak Company, Rochester, N.Y.

[21] Appl. No.: 27

[22] Filed: Jan. 2, 1987

[51] Int. Cl.$^4$ ............................................. C08G 63/52
[52] U.S. Cl. ................................... 528/306; 528/272; 528/302; 528/303; 528/304
[58] Field of Search ................ 528/272, 302, 303, 306

[56] References Cited

U.S. PATENT DOCUMENTS 4,414,382  11/1983  Morris et al. ........................ 528/298
4,459,402  7/1984  Morris et al. ........................ 528/298

Primary Examiner—Lucille M. Phynes
Attorney, Agent, or Firm—John F. Stevens; William P. Heath, Jr.

[57] ABSTRACT

The polyesters of trans-4,4'-stilbenedicarboxylic acid, 95 to 60 mol % 1,4-butanediol, and 5 to 40 mol % ethylene glycol can be injection-molded to give shaped objects having exceptionally high heat resistance. Many of the polyesters also have excellent hydrolytic stability and chemical resistance. The polyesters of this invention can be molded, extruded into film, or spun into fibers having these properties.

7 Claims, No Drawings

POLYESTERS OF TRANS-4,4'-STILBENEDICARBOXYLIC ACID, ETHYLENE GLYCOL, AND 1,4-BUTANEDIOL

TECHNICAL FIELD

This invention relates to high molecular weight copolyesters which are useful as films, fibers, and molding plastics. This invention is particularly concerned with copolyesters of trans-4,4'-stilbenedicarboxylic acid, 1,4-butanediol, and ethylene glycol.

BACKGROUND OF THE INVENTION

U.S. Pat. No. 2,657,195 broadly discloses polyesters of various stilbenedicarboxylic acid isomers with glycols, aminoalcohols, and diamines. Various glycols are disclosed containing 2 to 16 carbon atoms, but copolyesters of ethylene glycol and 1,4-butanediol are not specifically disclosed.

U.S. Pat. No. 3,496,839 relates to low molecular weight homopolymers of 4,4'-stilbenedicarboxylic acid and aliphatic glycols useful in radiation-cured crosslinked polyester coatings. Column 2, lines 20 to 44, contain a general listing of the glycols useful in these coatings. No examples are given using a combination of butanediol and ethylene glycol. Neither U.S. Pat. No. 2,657,195 nor U.S. Pat. No. 3,496,839 distinguishes one stilbenedicarboxylic acid isomer from another, i.e., 4,4'- from 3,3'- or cis- from trans-, etc.

Our own U.S. Pat. No. 4,420,607 (issued Dec. 13, 1983), U.S. Pat. No. 4,459,402 (issued Feb. 10, 1984), U.S. Pat. No. 4,468,510 (issued Aug. 28, 1984), U.S. Pat. No. 4,526,822 (issued July 2, 1985) all disclose polyesters based on stilbenedicarboxylic acid using various glycols. No examples of copolyesters based on the glycols claimed herein are specifically disclosed.

Our U.S. Pat. No. 4,551,520 discloses copolyesters based on terephthalic acid, trans-4,4'-stilbenedicarboxylic acid and 1,4-cyclohexanedimethanol.

Other patents which disclose trans-4,4'-stilbenedicarboxylic acid are Japanese Kokai 72348/74 and U.S. Pat. Nos. 2,657,194; 3,190,174; 3,247,043; 3,842,040; 3,842,041 and 4,073,777. Polyesters of trans-4,4'-stilbenedicarboxylic acid and neopentyl glycol, 1,5-pentanediol, 1,6-hexanediol, and 1,10-decanediol are disclosed by Meurisse, et al, in the *British Polymer Journal*, Vol. 13, 1981, page 57 (Table 1). Jackson and Morris disclose homopolyesters from trans-4,4'-stilbenedicarboxylic acid and various aliphatic glycols in the *Journal of Applied Polymer Science, Applied Polymer Symposia*, 41, 307–326 (1985). Our copending applications filed of even date herewith entitled "Polyesters of trans-4,4'-Stilbenedicarboxylic Acid, 1,6-Hexanediol, and 1,4-Butanediol" and "Polyesters of trans-4,4'-Stilbenedicarboxylic Acid, 1,6-Hexanediol, and Ethylene Glycol" also disclose polyesters based on trans-4,4'-stilbenedicarboxylic acid. No examples of copolyesters based on trans-4,4'-stilbenedicarboxylic acid, 1,4-butanediol and ethylene glycol are specifically disclosed.

DISCLOSURE OF THE INVENTION

The prior art discloses molding, spinning, and extruding into film as viable processes for shaping polymers based on stilbenedicarboxylic acid. We have discovered copolyesters based on trans-4,4'-stilbenedicarboxylic acid, 1,4-butanediol, and ethylene glycol having a combination of high heat deflection temperature, high flexural modulus, good processability, excellent hydrolytic stability, excellent chemical resistance, and high impact, flexural and tensile strengths.

According to the present invention, there are provided copolyesters comprising repeating units from at least 80 mol % trans-4,4'-stilbenedicarboxylic acid, repeating units from about 95–60 mol % 1,4-butanediol and repeating units from about 5–40 mol % ethylene glycol, the total mol % of acid components and glycol components each being 100 mol %, and the polyester having an inherent viscosity of 0.3 or more as determined at 25° C. in 25/35/40 (wt/wt/wt) phenol/tetrachloroethane/p-chlorophenol at a concentration of 0.1 g/100 mL.

Injection-molded bars consisting of copolyesters having repeating units from 100 mol % trans-4,4'-stilbenedicarboxylic acid, repeating units from 95 to 60 mol % 1,4-butanediol, and repeating units from 5 to 40 mol % ethylene glycol have an outstanding combination of properties. The as-molded copolyesters have unobviously high heat deflection temperatures. Many of the polymers of this invention have heat deflection temperatures above 200° C. and many are resistant to most organic solvents including toluene, gasoline, and methylene chloride. In addition, many of the copolyesters of this invention have exceptionally good hydrolytic stability, retaining 100% of their tensile strength after exposure in boiling water for ten days.

The copolyesters disclosed in U.S. Pat. Nos. 4,420,607; 4,468,510; 4,459,402; 4,414,382; and 4,526,822 all have heat resistance typical of polyesters (see Table 1). Heat deflection temperatures of these trans-4,4'-stilbenedicarboxylic acid glycol copolyesters of the prior art are all less than 140° C. and usually less than 100° C.

The copolyesters of this invention are prepared from trans-4,4'-stilbenedicarboxylic acid and/or its esters, 1,4-butanediol, and ethylene glycol. Examples of useful esters are the dimethyl, diethyl, dibutyl, diphenyl, or any combination of these mixed esters. The copolyesters may also be prepared from glycol esters or half-ester/half-acid derivatives of trans-4,4'-stilbenedicarboxylic acid.

The trans-4,4'-stilbenedicarboxylic acid portion of the polymers may contain minor amounts of other aromatic dicarboxylic acids such as terephthalic acid, isophthalic acid, 1,5-, 1,4-, 2,6-, or 2,7-naphthalenedicarboxylic acid, 4,4'-biphenyldicarboxylic acid, and the like. The dicarboxylic acid portion of the polymer may also contain minor amounts of aliphatic dicarboxylic acids such as malonic, succinic, glutaric, adipic, pimelic, suberic, azelaic, sebacic, cis- or trans-1,4-cyclohexanedicarboxylic, or dodecanedicarboxylic acid. These polyesters may contain up to about 20 mol % of these other dicarboxylic acids such that the sum of the dicarboxylic acid components is equal to 100 mol %. Essentially pure trans-4,4'-stilbenedicarboxylic is preferred.

The glycol portion of these polymers may contain minor amounts (not exceeding about 20 mol %) of other glycols such that the sum of the glycol components is equal to 100 mol %. Examples of useful glycols are 1,2-propanediol, 1,3-propanediol, 2,2-dimethyl-1,3-propanediol, trans- or cis-2,2,4,4-tetramethyl-1,3-cyclobutanediol, 1,5-pentanediol, 1,6-hexanediol, 1,3- or 1,4-cyclohexanedimethanol, or p-xylenediol.

In addition, poly(ether-imides) such as Ultem poly(ether-imide), polyphenylene oxides such as poly(2,6-dimethylphenylene oxide) or polyphenylene oxide/polystyrene blends such as Noryl, polyesters, poly(estercarbonates), polycarbonates such as Lexan, polysulfones, poly(sulfone-ethers), and poly(etherketones) of aromatic dihydroxy compounds may be used as blend modifiers to modify the properties of the copolyesters of this invention.

The copolyesters of this invention may contain antioxidants, conventional flame retardants such as phosphorus or halogen compounds, fillers such as talc or mica, or reinforcing agents such as glass fiber or carbon fiber.

The inherent viscosity of the copolyesters of this invention are at least 0.3 and preferably 0.6 or more. The copolyesters are prepared in the melt or by solid-phase polymerization or by a combination of these processes.

The examples which follow are submitted for a better understanding of the invention. The examples illustrate the exceptionally high heat resistance of the copolyesters of this invention (Table 1).

The inherent viscosities are determined in 60/40 (wt/wt) phenol/tetrachloroethane at 25° C. at a concentration of 0.5 g/100 mL. Where insufficient solubility is obtained inherent viscosities are determined at 25° C. in 25/35/40 (wt/wt/wt) phenol/tetrachloroethanol/p-chlorophenol at a concentration of 0.1 g/100 mL.

The polyesters are ground to pass a 3-mm screen, dried at 100° C. in a vacuum oven for 24 hr, and injection-molded on a 1-oz Watson-Stillman molding machine to give 5×½×⅛-in. flexure bars. The heat deflection temperature is determined following the procedure of ASTM D648 (264 psi load).

Example 1 illustrates the preparation of a polymer consisting of 100 mol % trans-4,4'-stilbenedicarboxylic acid units, 90 mol % 1,4-butanediol units, and 10 mol % ethylene glycol units.

EXAMPLE 1

A mixture of 177.6 g (0.60 mol) dimethyl trans-4,4'-stilbenedicarboxylate, 81.0 g (0.90 mol) 1,4-butanediol, 18.6 g (0.30 mol) ethylene glycol, and 0.11 g titanium tetraisopropoxide is placed in a one-liter flask equipped with an inlet for nitrogen, a metal stirrer, and a short distillation column. The flask is heated at 190° C. for 3 hr in a Wood's metal bath. The temperature is raised to 240° C. for about 30 min, and then to 260° C. for about 30 min, and finally to 290° C. A vacuum of 0.5 mm is applied in about 5 to 10 min. Full vacuum is maintained for about 8 min. A high melt viscosity, opaque polymer with an I.V. of 1.21 is obtained. The polymer is injection-molded at 290° C. to give flexure bars having a heat deflection temperature of 255° C.

EXAMPLE 2

A polyester consisting of 100 mol % trans-4,4'-stilbenedicarboxylic acid, 80 mol % 1,4-butanediol, and 20 mol % ethylene glycol is prepared and injection-molded according to the procedures of Example 1. A flexure bar injection-molded at 290° C. has a heat deflection temperature of 236° C.

EXAMPLE 3

This example illustrates the solid-phase polymerization of the polyester having the same composition as Example 2. A low molecular weight prepolymer is prepared as in Example 2 to an I.V. of 0.51 and solid-phase polymerized to an I.V. above 1.08. A flexure bar injection-molded at 295° C. has a heat deflection temperature of 225° C.

EXAMPLE 4

A polyester consisting of 100 mol % trans-4,4'-stilbenedicarboxylic acid units, 60 mol % 1,4-butanediol units, and 40 mol % ethylene glycol units is prepared and injection-molded at 300° C. according to the procedure of Example 1. The injection-molded flexure bars have heat deflection temperatures greater than 260° C. (i.e., the flexure bars do not deflect at 260° C. during testing).

The comparative examples in the lower portion of the table are prepared and injection-molded as described in U.S. Pat. Nos. 4,414,382, 4,459,402, and 4,526,822.

TABLE 1

Heat Deflection Temperatures of trans-4,4'-Stilbenedicarboxylic Acid Copolyesters

| Example | SDA,[a] Mol % | TPA,[a] Mol % | NDA,[a] Mol % | BD,[a] Mol % | EG[a] Mol % | I.V.[b] Initial | I.V.[b] Final | Heat Deflection Temp. °C. |
|---|---|---|---|---|---|---|---|---|
| — | 100 | — | — | 95 | 5 | 1.34 | 1.10[c] | >260 |
| 1 | 100 | — | — | 90 | 10 | 1.21[c] | 1.10 | 255 |
| 2 | 100 | — | — | 80 | 20 | 1.48 | 1.30 | 236 |
| — | 100 | — | — | 70 | 30 | 1.46 | 1.15 | 223 |
| 4 | 100 | — | — | 60 | 40 | [c] | [c] | >260 |
| (Control) | 80 | — | 20 | 100 | — | 1.04[d] | 1.01[d] | 68 |
| (Control) | 70 | — | 30 | 100 | — | 0.96[d] | 0.92[d] | 62 |
| (Control) | 50 | — | 50 | 100 | — | 1.05[d] | 1.00[d] | 53 |
| (Control) | 50 | 50 | — | 100 | — | 1.32[d] | 1.27[d] | 53 |
| (Control) | 50 | 50 | — | — | 100 | — | — | [e] |
| (Control) | 35 | 65 | — | — | 100 | 1.30[c] | 0.70[d] | 80 |
| (Control) | 25 | 75 | — | — | 100 | 0.61[d] | 0.61[d] | 75 |
| (Control) | 15 | 85 | — | — | 100 | 0.84[d] | 0.72[d] | 70 |
| (Control) | 50 | — | 50 | — | 100 | — | — | [e] |
| (Control) | 40 | — | 60 | — | 100 | 2.08[c] | 1.87[c] | 96 |

TABLE 1-continued

Heat Deflection Temperatures of trans-4,4'-Stilbene-dicarboxylic Acid Copolyesters

| Example | SDA,[a] Mol % | TPA,[a] Mol % | NDA,[a] Mol % | BD,[a] Mol % | EG[a] Mol % | I.V.[b] Initial | I.V.[b] Final | Heat Deflection Temp. °C. |
|---|---|---|---|---|---|---|---|---|
| (Control) | 20 | — | 80 | — | 100 | 0.92[d] | 0.83[d] | 90 |

[a]SDA = trans-4,4'-stilbenedicarboxylic acid, TPA = terephthalic acid, NDA = 2,6-naphthalenedicarboxylic acid. EG = ethylene glycol, BD = 1,4-butanediol.
[b]I.V.'s before and after injection molding. Unless indicated otherwise, the I.V.'s were determined in 25/35/40 (wt/wt/wt) phenol/tetrachloroethane/p-chlorophenol at 25° C. at a concentration of 0.1 g/100 mL.
[c]Insoluble matter was present in the I.V. solvent during the inherent viscosity determination.
[d]These polymers have adequate solubility to obtain inherent viscosity in 60/40 (wt/wt) phenol/tetrachloroethane at 25° C. at a concentration of 0.5 g/100 mL.
[e]These polymers are too high melting to process.

The invention has been described in detail with particular reference to preferred embodiments thereof, but it will be understood that variations and modifications can be effected within the spirit and scope of the invention.

We claim:

1. A copolyester comprising repeating units from at least 80 mol % trans-4,4'-stilbenedicarboxylic acid, repeating units from about 95-60 mol % 1,4-butanediol and repeating units from about 5-40 mol % ethylene glycol, the total mol % of acid components and glycol components each being 100 mol %, and said polyester having an inherent viscosity of 0.3 or more determined at 25° C. in 25/35/40 (wt/wt/wt) phenol/tetrachloroethane/p-chlorophenol at a concentration of 0.1 g/100 mL.

2. A copolyester according to claim 1 wherein the trans-4,4'-stilbenedicarboxylic acid is present in an amount of about 100 mol %.

3. A copolyester according to claim 1 wherein the acid component comprises up to 20 mol % of at least one other aromatic dicarboxylic acid having 8 to 20 carbon atoms.

4. A copolyester according to claim 1 wherein the I.V. is greater than 0.6.

5. A fiber comprising the copolyester of claim 1.

6. A film comprising the copolyester of claim 1.

7. A molded object comprising the copolyester of claim 1.

* * * * *